United States Patent Office 3,834,875
Patented Sept. 10, 1974

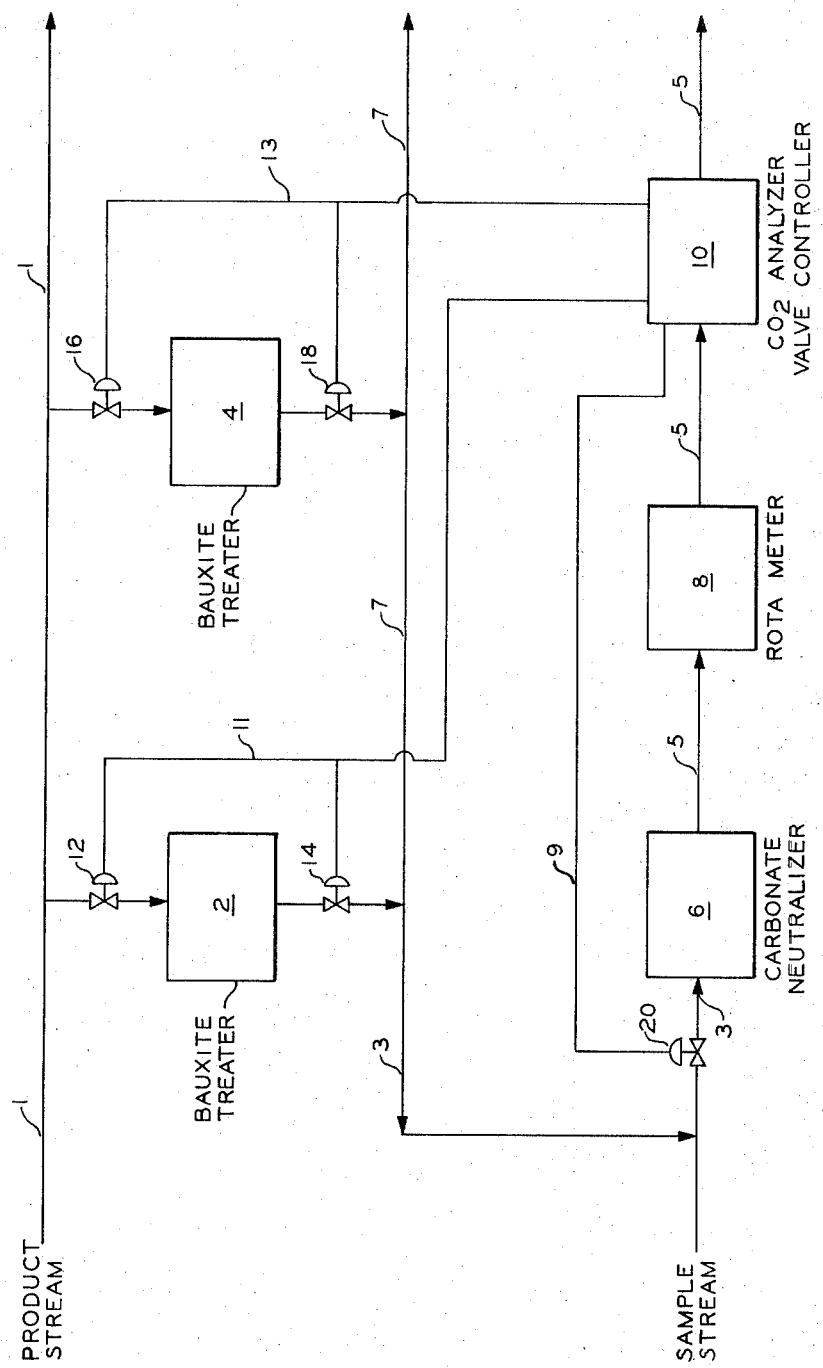

3,834,875
HYDROGEN FLUORIDE VAPOR
DETECTING SYSTEM
Otis E. Ririe, Jr., Bartlesville, Okla., assignor to
Phillips Petroleum Company
Filed Jan. 2, 1973, Ser. No. 320,502
Int. Cl. G01n 31/08
U.S. Cl. 23—232 C
7 Claims

ABSTRACT OF THE DISCLOSURE

A process for the detection of hydrogen fluoride which comprises the steps of neutralizing the hydrogen fluoride content of a hydrogen fluoride-containing stream in an inorganic carbonate whereby carbon dioxide is released in proportions related to the hydrogen fluoride content of the stream, passing a resulting carbon dioxide enriched stream essentially free of hydrogen fluoride into a chromatographic gas analysis apparatus, and detecting the presence of the carbon dioxide enrichment resulting from the HF neutralization.

---

This invention relates to a method for detecting hydrogen fluoride vapor.

In chemical or petroleum processes where HF is employed, it is frequently desirable to detect the presence and/or determine the amount of vaporous HF in a process stream. Heretofore, wherein chromatographic gas analysis techniques have been utilized to detect the presence of HF in a process stream, it has been essential that the HF be introduced directly into a chromatographic gas analyzer. Undesirably, however, this direct HF introduction practice requires that the analytical apparatus be constructed from relatively expensive materials, such as monel metal, in order to protect the analyzer from HF acid corrosion.

It is an object of this invention to provide a convenient means for detecting hydrogen fluoride within a product stream. Another object is to reduce the cost of detecting the presence of HF within a process stream. Still another object is to avoid the introduction of HF acid into a gas chromatographic analysis apparatus employed to detect the presence of hydrogen fluoride within a product stream. These and other objects will be readily apparent from the drawing, description and the appended claims.

In accordance with this invention, a process is provided for the detection of hydrogen fluoride which comprises the steps of neutralizing the hydrogen fluoride content of a hydrogen fluoride-containing stream with an inorganic carbonate whereby carbon dioxide is released in proportions related to the hydrogen fluoride content of the stream, passing a resulting carbon dioxide enriched process sample stream essentially free of hydrogen fluoride into a chomatographic gas analysis apparatus, sensing and detecting the presence of the carbon dioxide enrichment resulting from the HF neutralization.

In a preferred embodiment of this invention, the sample stream essentially free of hydrogen fluoride enriched in carbon dioxide as a result of HF neutralization is passed through a rotameter and then to a chromatographic gas analysis apparatus. The neutralization of the hydrogen fluoride content of the sample stream can be carried out with any suitable inorganic carbonate in any suitable neutralization zone. Representative of suitable inorganic carbonates that can be employed include alkali metal carbonates, alkaline earth metal carbonates, ammonium carbonate, and the like, and mixtures thereof. Representative alkali metal carbonates include primary and secondary carbonates of the formulas $MHCO_3$ and $M_2CO_3$ wherein M represents an alkali metal selected from lithium, sodium, potassium, rubidium, and cesium. Representative alkaline earth metal carbonates include normal carbonates of the formula $MCO_3$ wherein M is an alkaline earth metal selected from magnesium, calcium, strontium and barium.

Referring now to the drawing, the sole figure is a schematic illustration of a preferred embodiment of the invention.

An HF-containing sample stream 3 is passed to an inorganic carbonate neutralizer 6 wherein the hydrogen fluoride content contained within product stream 7 reacts with an inorganic carbonate to form a salt, carbon dioxide and water. The resulting carbon dioxide-enriched sample stream 5, at least essentially free of HF, is passed through rotameter 8, and into gas chromatographic analyzer 10. The gas analyzer 10 contains suitable means for detecting the presence of carbon dioxide in stream 5. In general, any chromatographic apparatus 10 can be employed, providing that the arrangement of the chromatographic columns and detectors suitably provide for the detection of carbon dioxide in the sample stream being passed through the apparatus. The packing of the gas chromatographic column can be any packing suitable for the separation of carbon dioxide from the other components of the sample stream. Any suitable carrier gas can be employed including helium, which is preferred, or hydrogen, nitrogen, argon, or any other inert gas which does not interfere with the detection of carbon dioxide. The source of the HF-containing sample stream 3 can be any chemical or petroleum-derived process stream which contains HF, such as process streams commonly associated with HF alkylation processes well known in the art. An HF alkylation stream 1 is passed through bauxite treater 2 for the primary purpose of removing any traces of hydrogen fluoride contained within a hydrocarbon fraction of an alkylation product stream. The major portion of the product stream effluent 7 from the bauxite treater 2 is passed to a product recovery zone (not shown). A minor portion of the product stream effluent from the bauxite treater 2 comprises sample stream 3 which is passed to carbonate neutralizer 6 for neutralization of any hydrogen fluoride contained within the product sample stream. Upon detection of carbon dioxide by the carbon dioxide analyzer 10, bauxite treatment of the product stream 1 is discontinued in bauxite treater 2 by closure of valves 12 and 14. The product stream 1 is passed to bauxite treater 4 containing fresh activated alumina, $Al_2O_3$ for the purpose of removing any hydrogen fluoride contained within the HF alkylation product stream 1. A major portion of the product stream effluent 7 from the bauxite treater 4 is passed to the product recovery zone (not shown), and a minor portion of the product stream effluent 3 is passed to the carbonate neutralizer 6. Upon detection of the presence of hydrogen fluoride within product sample stream 3 as described hereinbefore in association with carbonate neutralizer 6 and carbon dioxide analyzer 10, valves 16 and 18 are closed. Product stream 1 can be further treated for removal of any HF contained therein by passing the stream through bauxite treater 2 which has been recharged with fresh alumina during the period of time wherein the stream was passed through bauxite treater 4.

Many conventional parts commonly associated with the various process apparatus employed in the practice of this invention, such as heat sensitive or thermistor type sensing devices commonly employed with chromatographic gas analysis apparatus as well as potentiometers, solenoids, relay switches, have been omitted from the drawing for the sake of simplicity, but their inclusion will be understood by those skilled in the art.

Reasonable variations and modifications of the teachings of this invention will be readily apparent to those skilled in the art.

What is claimed is:

1. A process for the detection of hydrogen fluoride within a process stream which comprises the steps of neutralizing the hydrogen fluoride content of a hydrogen fluoride-containing stream with an inorganic carbonate thereby providing a carbon dioxide effluent, passing the thus-produced carbon dioxide effluent into a chromatographic analyzer for detection of the carbon dioxide effluent.

2. A process in accordance with claim 1, wherein the process stream is initially free of carbon dioxide.

3. A process in accordance with claim 1, wherein said carbonate is sodium carbonate.

4. A process in accordance with claim 1 wherein the inorganic carbonate is selected from the class consisting of alkali metal carbonates, alkaline earth metal carbonates, ammonium carbonates, and mixtures thereof.

5. A process in accordance with claim 4, wherein said alkali metal is selected from the class consisting of lithium, sodium, potassium, rubidium and cesium; wherein said alkaline earth metal is selected from magnesium, calcium, strontium and barium.

6. A process in accordance with claim 1, comprising the following steps and step sequence: passing an HF alkylation product stream into a first bauxite treater zone; passing a major portion of the bauxite treater effluent to a product recovery zone; passing a minor portion of the bauxite treater effluent into a carbonate neutralizer zone; neutralizing the hydrogen fluoride content of the minor portion of the bauxite treater effluent with an inorganic carbonate thereby providing a carbon dioxide effluent; passing the thus-produced carbon dioxide effluent into a chromatographic analyzer for detection of the carbon dioxide effluent.

7. A process in accordance with claim 6, further comprising the following steps and step sequence: detecting the presence of carbon dioxide in the chromatographic analyzer; by-passing the first bauxite treater zone with the HF alkylation product stream; passing the HF alkylation stream into a second bauxite treater zone; passing a major portion of the second bauxite treater effluent to a product recovery zone; passing a minor portion of the second bauxite treater effluent into a carbonate neutralizer zone; neutralizing the hydrogen fluoride content of the minor portion of the second bauxite treater effluent with an inorganic carbonate thereby providing a carbon dioxide effluent; passing the thus-produced carbon dioxide effluent into a chromatographic analyzer for detection of the carbon dioxide effluent.

References Cited

UNITED STATES PATENTS

| | | | |
|---|---|---|---|
| 3,049,909 | 8/1962 | Thomas | 55—67 X |
| 3,118,735 | 1/1964 | Favre et al. | 23—230 R |
| 3,546,079 | 12/1970 | Waclawik et al. | 23—232 E X |
| 3,558,279 | 1/1971 | McRae et al. | 23—232 E X |

ROBERT M. REESE, Primary Examiner

U.S. Cl. X.R.

23—230 R